Patented Sept. 10, 1935

2,014,143

UNITED STATES PATENT OFFICE

2,014,143

POLYAZO DYE AND PROCESS FOR PRODUCING THE SAME

Eugene A. Markush, Jersey City, N. J., assignor to Pharma-Chemical Corporation, New York, N. Y., a corporation of New York No Drawing. Application May 17, 1930, Serial No. 453,415

13 Claims. (Cl. 260—71)

My invention relates to the production of organic compounds having dyeing properties and refers particularly to processes for the production of polyazo dyes containing heterocyclic compounds such as pyrazolone compounds and derivatives, and the dyes resulting therefrom.

I have found that equal mols of tetrazo compounds and of heterocyclic compounds such as pyrazolone compounds and derivatives can be combined to form compounds which are capable of combination with amines and heterocyclic compounds such as pyrazolone compounds and derivatives to form compounds which, when diazotized, combine with amines, phenols, and pyrazolone compounds and derivatives to form valuable dyes.

Among the tetrazo compounds suitable in the following of my process are tetrazotized benzidine, tolidine, dianisidine, their sulpho acids, substitution products and derivatives.

Among the heterocyclic compounds particularly suitable for use in my process are pyrazolone, the aryl and alkyl derivatives of pyrazolone, their amino, carboxyl, nitro and halogen substituted derivatives and the sulpho acids of such derivatives; such as phenyl-methyl-pyrazolone, its nitro, amino and chloro compounds and sulpho acids of these products, sulpho-carboxyl-pyrazolone, its nitro, amino and chloro compounds and sulpho acids of these products, and the aryl and alkyl derivatives.

Among the amines and phenols suitable for the production of the dyes of my invention are amino and hydroxy benzenes, amino and hydroxy naphthalenes, amino and hydroxy anthraquinones, their aryl, alkyl, halogen, and nitro derivatives and sulpho acids of the same.

I do not limit myself to the particular products mentioned as these are given simply as examples of some of the compounds of the chemical groups which are suitable in the following of my process.

I give the following as examples of the process of my invention for the production of some of the new dyes resulting therefrom.

Example 1

One mol. of benzidine-disulphonic acid is tetrazotized in the usual manner. The tetrazotized benzidine-disulphonic acid is then added very slowly to a suspension or solution of one mol. of phenyl-methyl-pyrazolone. The suspension or solution of the latter compound is prepared by dissolving the compound in one mol. of sodium carbonate, then just acidifying the solution with hydrochloric acid and sufficient sodium acetate is added in order to neutralize all mineral acids.

It is essential to avoid any alkalinity during the coupling. The coupling usually requires 4 to 5 hours. The so obtained mono coupling product or intermediate, is allowed to run into a solution prepared from one mol. sulpho-amino-phenyl-pyrazolone-carboxylic acid and soda ash and the reaction mixture stirred for about 12 hours.

The dye so obtained is filtered, acidified with hydrochloric acid, diazotized and coupled with beta naphthol or its derivatives. The obtained dye dyes and prints silk in orange-red shade, fast to light and washing and probably has the following formula:—

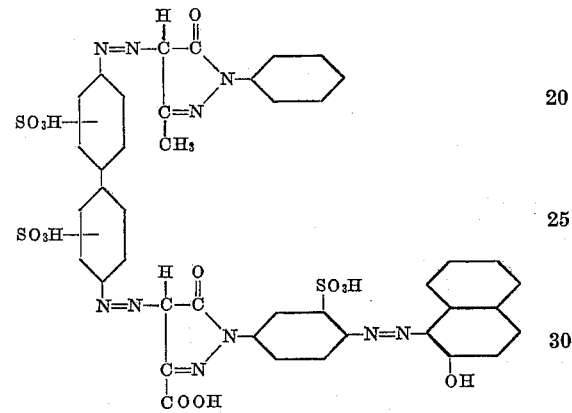

Example 2

Benzidine is tetrazotized and coupled with dichlor-sulpho-phenyl-methyl-pyrazolone as in Example 1, and the intermediary compound coupled further with sulpho-amino-phenyl-pyrazolone-carboxylic acid, also as in the above example.

The produce is rediazotized and coupled with the coupling product obtained from para-nitro-aniline and H acid which is prepared in the following manner: one mol. of para-nitro-aniline is dissolved in 300 parts of concentrated hydrochloric acid and 300 parts of hydrochloric acid at 80° C. The clear solution is added in a fine stream to a mixture of 500 parts of water and 500 parts of ice. The temperature should be about 8° C. when 70 parts of sodium nitrite in a 20% solution is added at once. The obtained diazonium is added very slowly to one mol. of H acid dissolved in 1000 parts of water containing one-half mol. of soda ash. The addition should take about two hours. It will probably require another 5 to 6 hours before the coupling is completed. The product is stirred for another 12 hours, then heated to 50° C. and 200 parts of a 30% caustic soda solution and 500 parts of soda ash added and salted out.

The obtained dye is filtered off, the paste stirred into 6000 parts of water, heated to about 75 to 80° C., then chilled with sufficient ice to obtain a temperature of 5° C.

The diazo compound formed from tetrazotized benzidine, dichlor-sulpho-phenyl-methyl pyrazolone and sulpho-amino-phenyl-pyrazolone-carboxylic acid is added to a suspension of diazotized para-nitro-aniline and H acid, stirred for several hours until the combination is completed.

The dye thus obtained produces on silk a deep green shade, fast to light and washing and probably has the following formula:—

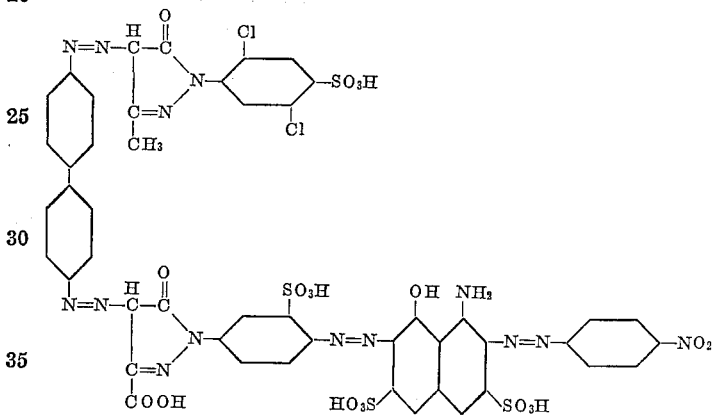

Example 3

One mol. of sulpho-phenyl-methyl pyrazolone is substituted for the phenyl-methyl-pyrazolone of Example 1. The dye produced dyes and prints silk in orange-red shade, fast to light and washing.

Example 4

One mol. of dichlor-sulpho-phenyl-methyl pyrazolone is substituted for the phenyl-methyl pyrazolone of Example 1, the resulting product dyeing and printing vegetable and animal fibers orange-red shades, fast to light an dwashing.

I do not limit myself to the particular chemical compounds, times, temperatures, quantities or steps of procedure set forth as these are given simply as a means for clearly explaining my invention.

What I claim is:—

1. The process of producing asymmetrical dyes which comprises combining one mol. of a tetrazotized compound of the diphenyl series with one mol. of a non-amino pyrazolone compound which is at least once substituted by chlorine, and one mol. of a diazotizable pyrazolone compound, diazotizing the thus produced compound and combining it with a coupling compound selected from the group consisting of amines of the benzene and naphthalene series, phenols of the benzene and naphthalene series, and mono-azo compounds.

2. The process of producing asymmetrical dyes which comprises combining one mol. of a tetrazotized compound of the diphenyl series containing at least one sulpho acid group with one mol. of a non-amino pyrazolone compound which is at least once substituted by chlorine and one mol. of a diazotizable pyrazolone compound, diazotizing the thus produced compound and combining it with a coupling compound selected from the group consisting of amines of the benzene and naphthalene series, phenols of the benzene and naphthalene series, and mono-azo compounds.

3. The process of producing asymmetrical dyes which comprises combining one mol. of a tetrazotized compound of the diphenyl series with one mol. of a sulpho-phenyl-methyl pyrazolone in which the phenyl group is at least once substituted by chlorine and one mol. of a diazotizable pyrazolone compound diazotizing the thus produced compound and combining it with a coupling compound selected from the group consisting of amines of the benzene and naphthalene series, phenols of the benzene and naphthalene series, and mono-azo compounds.

4. The process of producing asymmetrical dyes which comprises combining one mol. of a tetrazotized compound of the diphenyl series with one mol. of dichlor-sulpho-phenyl-methyl pyrazolone and one mol. of a diazotizable pyrazolone compound, diazotizing the thus produced compound and combining it with a coupling compound selected from the group consisting of amines of the benzene and naphthalene series, phenols of the benzene and naphthalene series, and mono-azo compounds.

5. The process of producing asymmetrical dyes which comprises combining one mol. of a tetrazotized compound of the diphenyl series containing at least one sulpho group with one mol. of a sulpho-phenyl-methyl pyrazolone in which the phenyl group is at least once substituted by chlorine and one mol. of a diazotizable pyrazolone compound, diazotizing the thus produced compound and combining it with a coupling compound selected from the group consisting of amines of the benzene and naphthalene series, phenols of the benzene and naphthalene series, and mono-azo compounds.

6. The process of producing asymmetrical dyes which comprises combining one mol. of a tetrazotized compound of the diphenyl series containing at least one sulpho group with one mol. of dichlor-sulpho-phenyl-methyl pyrazolone and one mol. of a diazotizable pyrazolone compound, diazotizing the thus produced compound and combining it with a coupling compound selected from the group consisting of amines of the benzene and naphthalene series, phenols of the benzene and naphthalene series, and mono-azo compounds.

7. The process of producing asymmetrical dyes which comprises combining one mol. of a tetrazotized compound of the diphenyl series with one mol. of a sulpho-phenyl-methyl pyrazolone in which the phenyl group is at least once substituted by chlorine and one mol. of a diazotizable pyrazolone compound containing at least one solubilizing member selected from the group consisting of the sulpho and carboxylic groups, diazotizing the thus produced compound, and combining it with a coupling compound selected from the group consisting of amines of the benzene and naphthalene series, phenols of the benzene and naphthalene series, and mono-azo compounds.

8. The process of producing asymmetrical dyes which comprises combining one mol. of a tetrazotized compound of the diphenyl series with one mol. of dichlor-sulpho-phenyl-methyl pyrazolone and one mol. of a diazotizable pyrazolone compound containing at least one solubilizing member selected from the group consisting of the sulpho and carboxylic groups, diazotizing the thus produced compound, and combining it with a coupling compound selected from the group consisting of amines of the benzene and naphthalene series, phenols of the benzene and naphthalene series, and mono-azo compounds.

9. The process of producing asymmetrical dyes which comprises combining one mol. of a tetrazotized compound of the diphenyl series with one mol. of a sulpho-phenyl-methyl pyrazolone in which the phenyl group is at least once substituted by chlorine and one mol. of sulpho-amino-phenyl-pyrazolone-carboxylic acid, diazotizing the thus produced compound, and combining it with a coupling compound selected from the group consisting of amines of the benzene and naphthalene series, phenols of the benzene and naphthalene series, and mono-azo compounds.

10. The process of producing asymmetrical dyes which comprises combining one mol. of a tetrazotized compound of the diphenyl series with one mol. of dichlor-sulpho-phenyl-methyl-pyrazolone and one mol. of sulpho-amino-phenyl-pyrazolone-carboxylic acid, diazotizing the thus produced compound, and combining it with a coupling compound selected from the group consisting of amines of the benzene and naphthalene series, phenols of the benzene and naphthalene series, and mono-azo compounds.

11. The process of producing asymmetrical dyes which comprises combining one mol. of a tetrazotized compound of a diphenyl series with one mol. of dichlor-sulpho-phenyl-methyl pyrazolone and one mol. of sulpho-amino-phenyl-pyrazolone-carboxylic acid, diazotizing the thus produced compound and combining it with the compound produced by combining diazotizing para-nitro-aniline with H acid.

12. An asymmetrical dye producible by the process of claim 1 and probably having the formula

X—N=N—R—N=N—Y—N=N—Z in which R represents the radical of a tetrazotized compound of the diphenyl series, X represents the radical of a non-amino pyrazolone which is substituted by at least one chlorine group, Y represents the radical of a diazotized amino-pyrazolone compound, and Z represents a coupling component selected from the group consisting of amines of the benzene and naphthalene series and phenols of the benzene and naphthalene series.

13. An asymmetrical dye having the formula

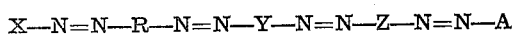

X—N=N—R—N=N—Y—N=N—Z—N=N—A in which R represents the radical of a tetrazotized compound of the diphenyl series, X represents the radical of a non-amino pyrazolone which is substituted by at least one chlorine group, Y represents the radical of a diazotized amino-pyrazolone, and Z represents a coupling compound selected from the group consisting of amines of the benzene and naphthalene series and phenols of the benzene and naphthalene series and wherein A is the radical of a diazotized amine of the group consisting of amines of the benzene and naphthalene series.

EUGENE A. MARKUSH.